Aug. 18, 1925.
J. L. LEMOINE
1,549,840
APPARATUS FOR THE PREPARATION OF INFUSIONS OF COFFEE AND THE LIKE
Filed July 21, 1924
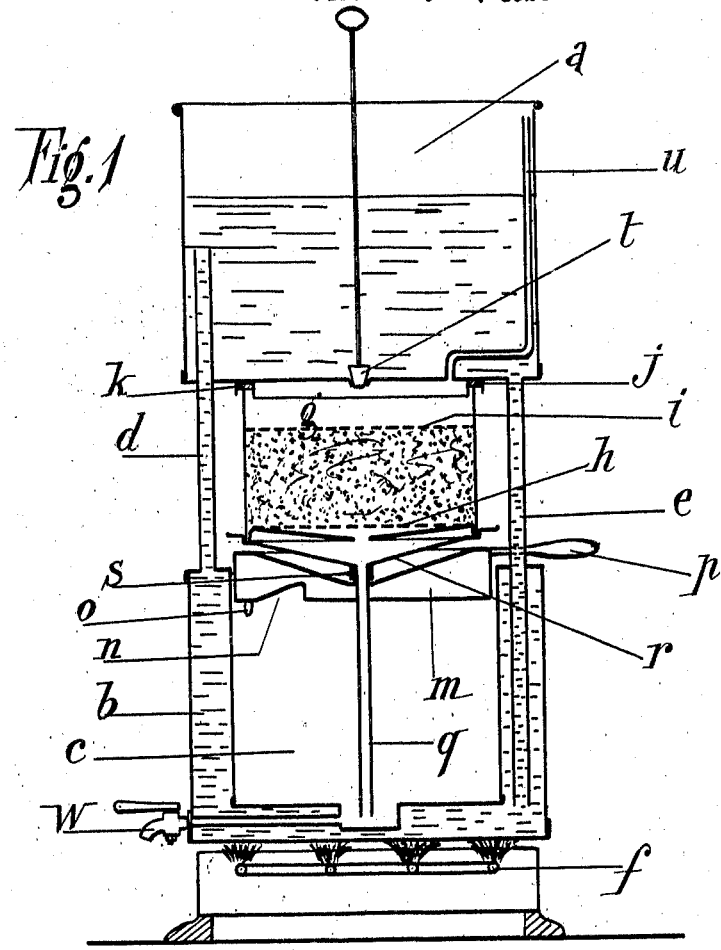
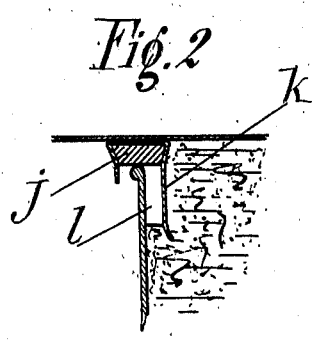
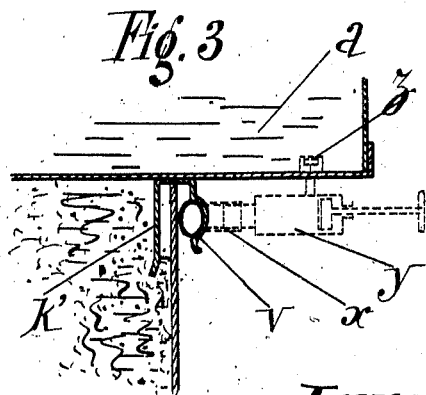
Inventor
J. L. Lemoine
By Marks & Clerk
Attys.

Patented Aug. 18, 1925.

1,549,840

UNITED STATES PATENT OFFICE.

JULES LOUIS LEMOINE, OF PARIS, FRANCE.

APPARATUS FOR THE PREPARATION OF INFUSIONS OF COFFEE AND THE LIKE.

Application filed July 21, 1924. Serial No. 727,379.

*To all whom it may concern:*

Be it known that I, JULES LOUIS LEMOINE, citizen of the Republic of France, residing at Paris, France, have invented certain new and useful Improvements in Apparatus for the Preparation of Infusions of Coffee and the like, of which the following is a specification.

The present invention relates to an apparatus for the treatment with boiling water of ground coffee or other similar product.

According to the invention, in this apparatus the filter in which the ground material is placed is independent of the water reservoir and is connected in a removable manner to such reservoir by a tight joint. This arrangement thus permits the recipient or filter to be easily separated from the rest of the apparatus and all manipulations, such as replacement of spent ground material by fresh ground material, etc., to be effected outside the apparatus.

The invention also includes the combination of the preceding apparatus with a double walled vessel receiving the infusion which leaves the filter, the chamber provided between the two walls of the said vessel being connected to the upper water reservoir in such a manner as to provide with the reservoir a closed circuit in which the water circulates by thermo syphon, this arrangement ensuring the heating by one and the same source of heat of the water in the said chamber and in the reservoir.

Apparatuses according to the invention are illustrated by way of example on the accompanying drawing, in which:—

Fig. 1 is a vertical section of an apparatus according to the invention.

On a larger scale:

Fig. 2 shows the tight jointing device of such apparatus.

Fig. 3 shows a jointing device suitable for apparatuses of large size.

The apparatus (Figs. 1 and 2) consists of an upper water reservoir $a$ and a lower double-walled water reservoir $b$, i. e. formed of two coaxial vessels the larger containing the other and preserving between their walls and bottoms a certain degree of separation. The upper borders of the two vessels are interconnected by a metal sheet soldered to the walls of the two vessels in such a manner as to close hermetically the space contained between the two vessels. The inner vessel $c$ is the receiver which receives the infusion of coffee or the like.

A source of heat $f$ placed beneath the vessel $b$ brings the water in the reservoirs to the desired temperature.

The reservoir $a$ and the vessel $b$ are interconnected by water circulation tubes such as $d$ and $e$. The tubes $d$ conduct the hottest water from the lower reservoir $b$ to the upper portion of the upper reservoir $a$. The tubes $e$ conduct the coldest water from the reservoir $a$ to the lower portion of the reservoir $b$. Thus a circulation of the water by thermosyphon is set up which enables the water to be very rapidly heated.

The coffee filter $g$ is cylindrical. It comprises, in the known manner, a lower sieve $h$ and an upper sieve $i$. It is so constructed that its upper end can be applied snugly against an india rubber washer $j$ (Figs. 1 and 2). Pressure exerted on the body of the filter $g$ makes a tight joint against the washer $j$. The washer $j$ (Figs. 1 and 2) is held in an annular channel $k$ the inner flange of which serves as a guide within the filter $g$ for a depth such that the water which fills the filter cannot come into contact with the rubber of the washer, the air trapped at $l$ (Fig. 2) preventing such contact.

In order that the joint of the filter $g$ against the washer $j$ be tight, it is necessary that the filter $g$ bears normally against the washer. Such normal pressure can be applied by a universal joint or other device.

Fig. 1 shows one of these ararngements included in the invention, the description of which is as follows:—

The infusion reservoir $c$ is closed by a cover $m$ the top of which forms a funnel. The outer border of the cover $m$ has three notches such as $n$ at equal intervals apart around the periphery of the cover. On the inner surface of the wall of the receiver $c$ are fixed three studs such as $o$ at equal distances around the periphery of the wall of $c$ and at equal distances from the upper border of the receiver $c$. The lower border of the cover $m$ bears therefore against the studs $o$ and when the cover is turned through an appropriate angle, the notches $n$ engaging on the studs $o$ impress on the cover $m$ a vertical movement of ascent or descent. A handle $p$ (Fig. 1) fixed on $m$ enables such manipulation to be effected.

The funnel constituted by the cover $m$ is perforated at its centre by a hole in which exactly fits the tube $q$ of a funnel $r$ the upper portion of which forms a flanged platform on which is placed and seated the coffee filter $g$. A small metal sleeve $s$ is soldered on the top of the tube $q$ against the conical portion of the funnel $r$. The bottom of the sleeve $s$ bears against the central portion of the funnel of the cover $m$ so that the platform funnel $r$ conforms to the movements of ascent and descent of the cover $m$.

The centre of the bottom of the reservoir $a$ is perforated with an orifice which can be opened or closed by a plug $t$ with a manipulating stem. This plug may be replaced by a cock or other suitable closure device.

A tube $u$ vents the air contained in the filter $g$ when the apparatus is set in operation.

Fig. 3 shows a lateral joint suitable for substitution for the jointing washer $j$. This alternative joint can be employed when the diameter of the filter $g$ is of large dimension. It comprises an annular endless tube $v$ of india rubber, lodged in a suitable recess formed in the annular channel $k^1$. The tube $v$ has at one of its joints a nipple $x$ in which engages the nozzle of a small pump $y$ which takes water from the upper reservoir $a$ and delivers same into the annular tube $v$. A small valve 3 is suitably provided to that effect and the piston of the pump $y$ is maintained in its end position by a suitable device. The reservoir being in place, the water is forced under pressure into the rubber tube which inflates and makes an hermetic joint against the upper outer surface of the wall of the filter.

The above described apparatus is used in the following manner:—

The reservoirs are filled with water by pouring such water into the reservoir $a$ and the burner $f$ is lighted. The coffee container $g$ filled with a sufficient quantity of ground coffee is placed on its seat on the platform $r$ which occupies the lowest position of its stroke by virtue of a displacement of the handle $p$ which has brought the bases of the notches $n$ over the studs $o$.

The container $g$ is then clamped against the washer $j$ by manipulating the handle $p$ which causes the inclines of the notches $n$ to ride on the studs $o$ thus forcing the assemblage of funnels to rise until the pressure of the container $g$ against the washer $j$ is sufficient to ensure the fluid-tightness of the joint. The vertical thrust being effected through the centre of the platform funnel $r$, the clamping of the border of the reservoir $g$ against the washer $j$ is effected uniformly at all points of the joint which will thus be perfectly fluid tight.

When the water boils the flame of the burner $f$ is extinguished or diminished, the plug $t$ is raised, the water flows into the coffee container $g$ and the air contained in such container escapes by the tube $u$.

The infusion made flows into the funnel $r$ and by means of the tube $q$ arrives in the lower portion of the reservoir $c$, which has the effect of ensuring that a thoroughly uniform infusion is obtained.

When the reservoir $a$ is empty of water there remains nevertheless around the reservoir $c$ a jacket $e$ of boiling water which keeps the infusion in the receiver $c$ at a suitable temperature.

After the operation, the coffee container $g$ is lowered by manipulation of the handle $p$ and can be withdrawn, cleaned and recharged for another operation.

A tube $w$ with a cock enables the infusion to be drawn off from the receiver $c$.

Claims:

1. In an apparatus for the preparation of an infusion of coffee and other similar infusions, a water reservoir, a filter adapted to contain the material to be treated such as ground coffee, a tight joint interposed between the water reservoir and the filter, means for permitting the hot water to flow from the reservoir into the filter, a double walled vessel to receive the infusion passing from the filter, means connecting the interior of said double walled vessel with the water reservoir whereby to create a thermo-siphon circulation, means to heat said vessel.

2. In an apparatus for the preparation of an infusion of coffee and other similar infusions, a water reservoir communicating freely with the atmosphere, means to heat said reservoir, a filter containing the material to be treated such as ground coffee, a joint interposed between the water reservoir and the filter, means for compressing said joint, means for permitting the hot water to flow from the reservoir into the filter.

3. In an apparatus for the preparation of an infusion of coffee and other similar infusions, a water reservoir communicating freely with the atmosphere, means to heat the reservoir, a filter containing the material to be treated such as ground coffee, a fluid-tight joint interposed between the water reservoir and the filter, means for permitting the hot water to flow from the reservoir into the filter, a receptacle for collecting the infusion, a container covering said receptacle, means permitting of raising or lowering said container, a second container resting on the first container and serving as a support for the filter.

4. In an apparatus for the preparation of an infusion of coffee and other similar infusions, a water reservoir communicating freely with the atmosphere, means to heat the water in said reservoir, a filter containing the material to be treated such as ground coffee, a joint interposed between the water reservoir and the filter, means for permitting the hot water to flow from the reservoir into the filter, a receptacle for collecting the infusion, a first container covering said receptacle and having inclined notches, means coacting with said notches to tighten said joint, a second container resting on the first container and serving as a support for the filter.

5. In an apparatus for the preparation of an infusion of coffee or other similar infusions, a water reservoir, means to heat the reservoir, a filter containing the material to be treated such as ground coffee, a closure member forming a tight joint between the filter and the water reservoir, an annular ring interposed between the filter and the water reservoir and maintaining the closure member in position, said ring forming an air chamber interposed between the liquid of the filter and the closure member and thus preventing all contact between the liquid and said member.

6. In an apparatus for the preparation of an infusion of coffee and other similar infusions, a water reservoir, means for heating the water in said reservoir, a filter containing the material to be treated such as ground coffee, an annular ring interposed between the filter and the water reservoir, an annular rubber tube applied on the periphery of the filter, means to inflate said tube with a fluid under pressure.

7. In an apparatus for the preparation of an infusion of coffee and other similar infusions, a water reservoir, means for heating the water in said reservoir, a filter containing the material to be treated such as ground coffee, an annular ring interposed between the filter and the water reservoir, an annular rubber tube applied on the periphery of the filter by said annular ring, a pump connected on the one hand to the water reservoir and on the other to the annular tube, said pump permitting of forcing the water under pressure into said tube.

In testimony whereof I affix my signature.

JULES LOUIS LEMOINE.